June 26, 1951     G. ORESCAN     2,558,194
APPARATUS FOR THE FLUID CATALYTIC CONVERSION
OF DIFFERENT HYDROCARBON FEEDS
Filed July 26, 1946
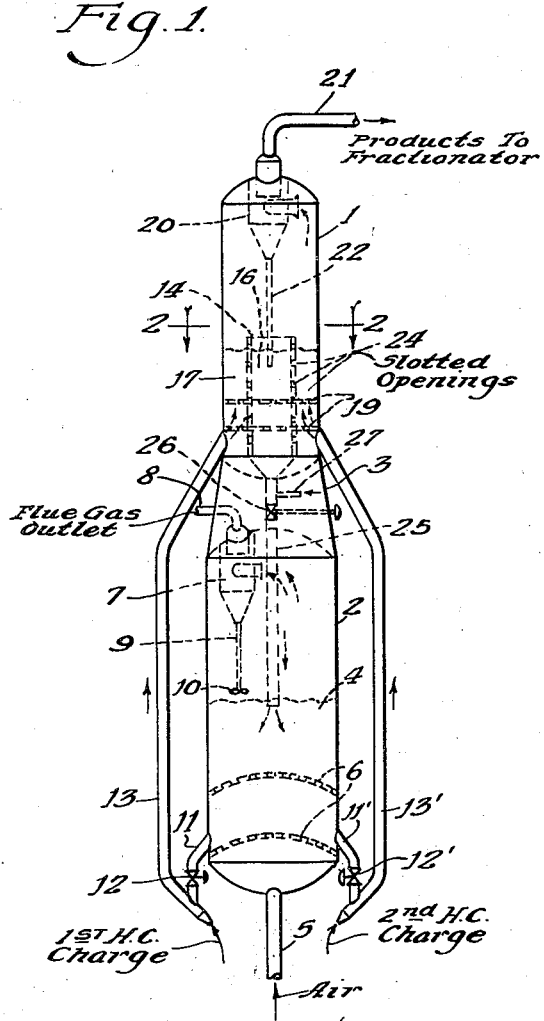
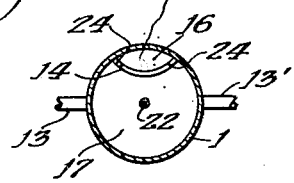
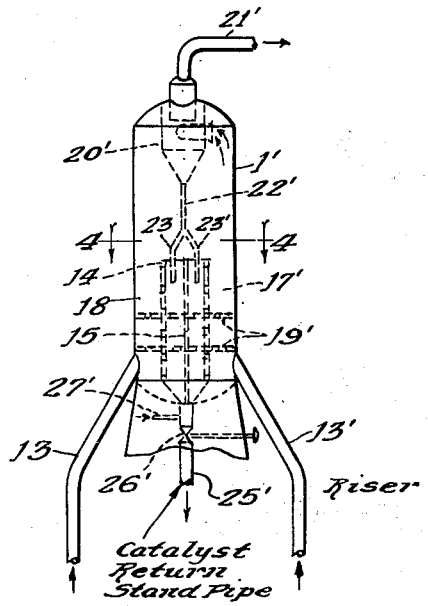
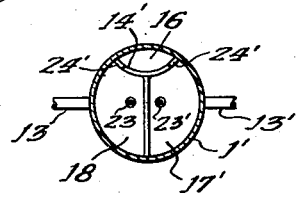
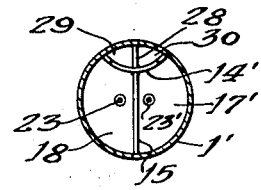
INVENTOR.
George Orescan
BY Maynard P. Venema
Attorney Patented June 26, 1951

2,558,194

UNITED STATES PATENT OFFICE 2,558,194

APPARATUS FOR THE FLUID CATALYTIC CONVERSION OF DIFFERENT HYDROCARBON FEEDS

George Orescan, Gary, Ind., assignor to Universal Oil Products Company, Chicago, Ill., a corporation of Delaware Application July 26, 1946, Serial No. 686,331

4 Claims. (Cl. 23—288)

This invention relates to an improved apparatus and method for effecting the simultaneous conversion of different hydrocarbon feed stocks with fine sub-divided solid particles. More specifically, a compact unitary type of apparatus is provided whereby the fluid catalytic conversion of two or more feed materials may be carried out, with different operating conditions on each, in an easy and efficient manner.

In the usual fluidized catalytic conversion unit, where more than one feed stock is to be converted, the contact zones or chambers for the reactants and fluidized contact particles are maintained substantially separate one from another. Also, reaction zones are not usually maintained in close vertical alignment with the regenerating zone or zones such that the fluidized transfer of material from the various contacting zones is unnecessarily complicated.

One of the principal objects of this invention is to provide means for effecting the conversion of more than one type of charging stock in an improved manner that necessitates the use of but one reactor chamber and one regenerating chamber for the fine sub-divided contact material.

Another object of the invention is to provide a compact fluid catalytic combustion unit where the reactor chamber is above and in vertical alignment with the regenerating chamber.

Still another object is to provide a reactor chamber which is divided into a plurality of adjacent contact sections, each of which are in communication with a single reaction product outlet and a common catalyst return line, and where each section functions so that more than one charge and dense phase catalyst bed may be accommodated within the unit.

In a preferred form of the unit, the regenerating zone is placed below the reactor chamber and there are two or more risers from the lower end of the regenerator to the lower portion of the reactor chamber, one riser being provided for each of the feed stocks which are to be catalytically converted within the unit. The hydrocarbon feeds are admitted to the lower ends of each of the risers, such that the feeds will serve as a fluidizing medium and so that there is an effective contact obtained throughout the full length of the riser, as the material flows upwardly to the reactor chamber. The reactor chamber may be constructed to accommodate one or more dense phase fluidized beds. That is, modifications may be made in the reactor chamber by the use of vertical partitioning plates arranged within its lower portion whereby two or more dense phase contact sections and stripping zones may be provided. However, only a single light phase zone is maintained within the upper portion of the chamber and but a single outlet is provided for the reaction products at the upper end of the chamber. Also, each of the adjacent contact sections, for the dense phase beds connect with a single used catalyst transfer conduit which is provided at the lower end of the reactor chamber, and transfers the used catalyst particles to the top of the dense phase bed maintained within the regenerating zone. In the lower portion of the reactor chamber, a specially arranged perforated slotted plate is provided to form a catalyst withdrawal well and stripping section, so that used catalyst flows laterally from the dense phase bed, or beds, into the withdrawal zone and thence through the used catalyst transfer conduit to the regenerator.

In the fluidized catalytic cracking process, no one particular feed stock need be used, the feed may be a light gas oil, a heavy gas oil, a topped crude, or the like. All oils, of course, do not have the same cracking or conversion characteristics and where it is desired to effect the conversion of a plurality of feed stocks, this present invention provides for the conversion of each under optimum conditions and in an efficient manner, without following the practice of mixing various feeds into a common oil blend. The mixing of varying feeds results in the over cracking of some of the feeds and the under cracking of others, thus, this improved apparatus and method of operation permits the conversion to be controlled in such a way that a substantially uniform carbon deposit is obtained on the catalyst by each of the different feed stocks. Different conversion conditions or a varying treatment may be given the different feeds by altering the "space velocity" in each of the catalyst riser lines. ("Space velocity" is commonly defined as being the volume of liquid charged per hour per unit volume of catalyst maintained in the contact zone.)

Where there is but little difference in the charge stocks and varying space velocities in the different risers themselves can effect the necessary differences in the conversion, then the reactor chamber may be in a simplified form with the risers discharging to the lower end of the reactor and into but a single dense phase catalyst bed. The feed materials then become blended in the single dense phase bed which is maintained to provide for further catalyst contact and conversion. However, where it is advisable to treat each of the feed stocks separately in further catalytic contact within the reactor chamber, then the aforementioned vertical dividing plates are provided in the reactor chamber such that separate dense phase contact beds may be maintained separately within the common reactor chamber, one bed for each different riser and feed stock.

The use of a perforated partitioning plate, which is arranged to provide for the lateral withdrawal of used catalyst into a common well and a transfer stand-pipe, is of particular advantage in effecting an economical transfer of material and an efficient fluidized operation. Also, the placing of the regenerator directly below the reactor makes it possible to pass the oxidizing or reactivating medium countercurrent to the flow of the catalyst particles, the latter being discharged to the top of the dense phase bed in the regenerator. The operation and further advantageous features of the unit will be more apparent upon reference to the accompanying drawing and to the following description of the apparatus and the flow therethrough.

Figure 1 is a diagrammatic elevational view of the improved unitary apparatus which is arranged to simultaneously convert different hydrocarbon feeds.

Figure 2 is a sectional plan view through the conversion chamber, as indicated by the line 2—2 in Figure 1.

Figure 3 of the drawing is a partial elevational view of the upper contact chamber, wherein two feed lines discharge into a divided reaction chamber.

Figure 4 is a sectional plan view through the conversion chamber of Figure 3, as indicated by the line 4—4.

Figure 5 indicates another modification of the conversion chamber having partitioning plates arranged to provide two stripping sections.

Referring now to Figures 1 and 2 of the drawing, the conversion or reactor chamber 1 is placed directly above the regenerating chamber 2 and is supported from the latter by a separating skirt section 3. A single dense phase contact bed 4 is maintained in the lower portion of the regenerator 2, the catalyst particles being maintained in a state of hindered settling therein by an oxidizing and regenerating medium, such as air, which is charged to the lower end of the chamber through the line 5. The regenerating medium effects a burning and removal of the deleterious carbonaceous deposit on the catalyst particles such that the latter become reactivated and may be reused and recirculated to the upper reactor chamber. Perforated plates or distribution grids 6 are placed across the regenerating chamber and serve to distribute the catalyst particles and the regenerating medium, such that an efficient contact is obtained between the two and better regeneration of the catalyst thereby obtained. The combustion and flue gas from the oxidizing and regenerating contact, are separated from the catalyst particles by means of a centrifugal type separator 7 and are discharged from the upper end of the chamber through a flue gas outlet 8. The hot combustion gases are continuously discharged through outlet 8 and may first be passed to a waste heat boiler or other heat recovery apparatus (not shown) or the gases may be discharged directly to the atmosphere. The catalyst particles which are recovered by the separator 7 are returned to the dense phase bed by means of dip-pipe 9 having a control valve 10. Reactivated catalyst is withdrawn from the lower end of the regenerator 2 through lines 11 and 11' having respectively, control valves 12 and 12'. The reactivated particles are subsequently picked up by hydrocarbon feeds which are charged to riser lines 13 and 13' and flow to the lower end of the reactor chamber 1. This lower part of the reactor 1 is provided with a vertical partitioning plate 14 such that there is formed a stripping zone 16 and an adjacent dense phase contact zone 17. The hydrocarbon feed and the catalyst particles from riser line 13 are discharged into the contact zone 17, along with a second hydrocarbon feed and fluidized catalyst particles from riser line 13'. Two different space velocities or conversion conditions may be used in connection with each of the different feed materials in the risers 13 and 13', but in this modification, further catalytic conversion is carried out in a single common dense phase contact bed. Distributing grid plates 19 are also placed across the contact section 17, in a preferable form of the apparatus, such that good distribution and contact is obtained within the dense phase zone.

The reaction products, resulting from the catalyst contacts in each of the two risers and the dense phase zone of the reactor chamber, become mixed within the upper portion of the reactor chamber 1 and pass through a centrifugal type of solid particle separator 20. The products are then discharged through outlet line 21, while catalyst particles, which are retained by the catalyst separator 20, are returned to the dense phase zone 17 by means of pipe 22.

In the partition plate 14, there are provided holes, or spaced slotted openings 24. The latter are indicated in the drawing along each side of plate 14 where it joins the reactor chamber shell 1. These openings are provided for the withdrawal of used and contaminated catalyst from the contact zone 17, and in this modification a single stripping zone 16 receives the used catalyst particles prior to their return to the regenerating zone 4. The lower end of the stripping section 16 connects with conduit 25, having control valve 26, such that catalyst particles may be passed directly and in controlled amounts to the dense phase bed 4 within the regenerating chamber 2. Countercurrent stripping of the used catalyst particles is effected within the stripping section 16 by means of steam, flue gas, or other types of relatively inert stripping medium which may be charged through line 27 at a point just below the lower end of the enlarged stripping zone 16 and the reactor chamber 1.

This simplified modification may be employed particularly when there is but little difference in the type of feed stocks which are charged to the unit and differences in space velocities and in conversion conditions may be effected in the risers themselves to provide the desired optimum conversion within the unit.

Referring now to Figures 3 and 4 of the drawing, a modified reactor chamber is shown in combination with a lower regenerating chamber and multiple riser lines such as are shown in Figure 1 of the drawing. The reactor chamber 1' has a vertical partitioning member 14' and another member 15 such that there is formed therein a single stripping section 16' and two dense phase contact zones 17' and 18. The two risers 13 and 13' communicate with the lower end of the dense phase zones such that the hydrocarbon feed and fluidized catalyst particles from riser line 13 are discharged to the contact zone 18, while the feed and catalyst from riser line 13' are discharged into contact zone 17'.

The reaction products, resulting from the separate contacts and conversion conditions, become commingled within the upper light phase zone of the reactor chamber and pass through the centrifugal separator 20'. The products are subsequently discharged through outlet 21' and transferred to fractionating and recovery equipment (not shown). Recovered catalyst particles within the separator 20' are returned to the lower portion of the reactor by means of the dip leg 22', which in this modification shown, splits into dip pipes 23 and 23' so that catalyst particles are returned equally to each of the contact tubes 17' and 18. It is not necessary, however, that the dip leg be split, for the amount of catalyst returned through it, is relatively small. As in Figure 1, horizontal distributing grids 19' are placed across the dense phase zones 17' and 18 whereby efficient distribution and contact is obtained between the reactant materials. The partitioning member 14' is provided with slotted openings 24' such that the used catalyst particles may be passed laterally from each of the dense phase zones 17' and 18 into the stripping section 16' and subsequently descend through the stand pipe 25' to the regeneration section directly below. Also, as in Figure 1 of the drawing, the control of the flow in stand pipe 25' may be made by means of an adjustable control valve 26'. A stripping medium is charged to the lower end of the stripping section 16' and the stand pipe 25' through line 27'. The stripping medium may be steam, flue gas or some relatively inert gaseous medium which will ascend upwardly through the stripping section to remove entrained volatile material and can become diffused with the reaction products within the upper portion of the reactor 1'.

The apparatus as shown in Figures 3 and 4 has only two riser lines and two dense phase contact zones within the upper reactor chamber. However, additional withdrawals and riser lines from the regenerator may be provided within the scope of this invention, if more than two charge stocks are to be processed, and in addition other partitioning members in the reactor 1' can be provided to form more than two contact zones.

Figure 5 of the drawing indicates still another modification which may be made within the reaction chamber to provide more than one stripping section. The divided chamber of Figures 3 and 4 is provided with an additional vertical and solid partitioning member 28 such that two stripping sections 29 and 30 are provided. This partitioning, however, stops short of the lower end of the withdrawal well so that the separately withdrawn streams will combine for their descent into the regenerating zone. Separate stripping zones are desirable where the dense phase levels within the contact zones 17' and 18 are likely to be at considerably different levels. Thus, substantially uniform withdrawals may be made from each of the zones and a more efficient operation and use of the catalyst thus obtained.

Variations may, of course, be made in the positioning of the vertical partitioning members and as previously noted, more than two adjacent contact sections and riser lines may be employed, however, such modifications are held to be within the broad scope of this invention which is directed to a compact arrangement of the contact zones and the means for transferring the material from one to the other.

I claim as my invention:

1. An apparatus for effecting contact between fluid reactants and finely divided solid catalyst particles which comprises an upper contact chamber and a lower contact chamber in substantially vertical alignment, said upper chamber being partitioned vertically in the lower portion thereof to form a plurality of adjacent contacting zones, a fluid inlet to and a fluid outlet from said lower chamber, a plurality of catalyst outlets from said lower chamber, a plurality of riser conduits connecting said catalyst outlets with said contacting zones and fluid inlets at the lower portions of said riser conduits, a perforated vertical partition in the lower portion of said upper chamber forming with the wall of the latter an elongated catalyst withdrawal well, an outlet conduit connecting the bottom of said withdrawal well with said lower chamber, and a fluid outlet from the upper portion of said upper chamber.

2. An apparatus for effecting contact between fluid reactants and finely divided solid catalyst particles which comprises an upper contact chamber and a lower contact chamber in substantially vertical alignment, said upper chamber being partitioned vertically in the lower portion thereof to form a plurality of adjacent contacting zones, a fluid inlet to and a fluid outlet from said lower chamber, a plurality of catalyst outlets from said lower chamber, a plurality of riser conduits connecting said catalyst outlets with said contacting zones and fluid inlets at the lower portions of said riser conduits, a perforated vertical partition in the lower portion of said upper chamber forming with the wall of the latter an elongated catalyst withdrawal well, said well being further partitioned vertically in the upper portion thereof to form a plurality of withdrawal zones, a common bottom portion in said withdrawal well in open communication with said withdrawal zones, an outlet conduit connecting the bottom of said withdrawal well with said lower chamber, and a fluid outlet from the upper portion of said upper chamber.

3. Apparatus for contacting finely divided solid particles with a plurality of different reactant streams, which comprises in combination, an upper contact chamber, a lower contact chamber, said chambers being positioned in vertical alignment with one another and adapted to maintain zones of fluidized finely divided solid particles therein, a fluid inlet and a fluid outlet connecting to said lower chamber, a plurality of solid particle outlets from said lower chamber, separate riser conduits communicating with each of said solid particle outlets and connecting the latter with a plurality of adjacent contact sections in the lower portion of said upper contact chamber, fluid inlets at the lower ends of each of said riser conduits, said last named fluid inlets and said risers being constructed and arranged to transfer withdrawn solid particles from said lower chamber in fluidized streams to said contact sections, partitioning means placed vertically within the lower portion of said upper chamber forming thereby said plurality of adjacent contact sections, a separate contact section being provided for each of said riser conduits, perforated partitioning means disposed vertically within the lower portion of said upper chamber thereby forming an elongated solid particle withdrawal well communicating by means of perforations therein with each of said contact sections whereby solid particles may be received laterally therefrom, a conduit connecting the lower end of said withdrawal well with the interior of said lower contact chamber, an inlet for a fluid stripping medium at the lower end of said withdrawal well, and outlet means for discharging reaction products substantially free of suspended solid particles from the upper portion of said upper contact chamber.

4. Apparatus for contacting finely divided solid particles with a plurality of different reactant streams, which comprises in combination, an upper contact chamber, a lower contact chamber, said chambers being positioned in vertical alignment with one another and adapted to maintain zones of fluidized finely divided solid particles therein, a fluid inlet and a fluid outlet connecting to said lower chamber, a plurality of solid particle outlets from said lower chamber, separate riser conduits communicating with each of said solid particle outlets and connecting the latter with a plurality of adjacent contact sections in the lower portion of said upper contact chamber, fluid inlets at the lower ends of each of said riser conduits, said last named fluid inlets and said risers being constructed and arranged to transfer withdrawn solid particles from said lower chamber in fluidized streams to said contact sections, solid partitioning means placed vertically within the lower portion of said upper chamber forming thereby said plurality of adjacent contact sections, a separate contact section being provided for each of said riser conduits, perforated partitioning means disposed vertically within the lower portion of said upper chamber thereby forming an elongated solid particle withdrawal well, additional solid partitioning means positioned vertically within said withdrawal well forming thereby a plurality of independent vertical stripping sections, said perforated partitioning means and said additional solid particle means being arranged such that each of said stripping sections communicates by means of perforations in said perforated partitioning means with one of said contact sections whereby solid particles may be received laterally and in separate streams from said contact sections, an unobstructed lower portion within said withdrawal well in open communication with each of said stripping sections, a conduit connecting said lower portion of said withdrawal well with the interior of said lower contact chamber, an inlet for a stripping medium at the lower end of said withdrawal well, and outlet means for discharging reaction products substantially free of suspended solid particles from the upper portion of said upper contact chamber.

GEORGE ORESCAN.

REFERENCES CITED

The following references are of record in the file of this patent:

UNITED STATES PATENTS

| Number | Name | Date |
|---|---|---|
| 2,367,281 | Johnson | Jan. 16, 1945 |
| 2,367,694 | Snuggs | Jan. 23, 1945 |
| 2,377,613 | Conn | June 5, 1945 |
| 2,378,542 | Edmister | June 19, 1945 |
| 2,385,446 | Jewell et al. | Sept. 25, 1945 |
| 2,390,244 | Finlayson | Dec. 4, 1945 |
| 2,394,814 | Snuggs | Feb. 12, 1946 |
| 2,405,395 | Bahlke et al. | Aug. 6, 1946 |
| 2,427,341 | Alther | Sept. 16, 1947 |